United States Patent [19]

Gerlowski

[11] Patent Number: 4,609,523

[45] Date of Patent: Sep. 2, 1986

[54] PASSIVE PH ADJUSTMENT OF NUCLEAR REACTOR CONTAINMENT FLOOD WATER

[75] Inventor: Thomas J. Gerlowski, Crafton, Pa.

[73] Assignee: Westinghouse Electric Corp., Pittsburgh, Pa.

[21] Appl. No.: 576,060

[22] Filed: Feb. 1, 1984

[51] Int. Cl.⁴ ............................................. G21C 19/42
[52] U.S. Cl. .................................... 376/309; 376/282; 376/306
[58] Field of Search ............... 376/306, 309, 282, 283, 376/273, 370, 373, 308; 252/626

[56] References Cited

U.S. PATENT DOCUMENTS 2,907,689  10/1959  Kidder et al. .................. 376/306 X
3,715,316   2/1973  Soldano ........................ 376/309 X
3,859,166   1/1975  Flynn et al. .................... 376/282

Primary Examiner—Stephen C. Bentley
Assistant Examiner—John S. Maples
Attorney, Agent, or Firm—Daniel C. Abeles

[57] ABSTRACT

A passive method of adjusting the pH of the liquid used to flood the containment structure of a nuclear reactor following an accident such as loss of primary or secondary coolant. Perforated containers or baskets, which contain a pH adjusting chemical which is soluble in the flooding liquid (usually a slightly acidic solution of borated water) and which are covered or encapsulated with a plastic protective material, which is like soluble in the flooding liquid, are located in the emergency containment sumps.

17 Claims, 4 Drawing Figures

PASSIVE PH ADJUSTMENT OF NUCLEAR REACTOR CONTAINMENT FLOOD WATER

BACKGROUND OF THE INVENTION

The present invention relates to a method and apparatus for automatically and passively adjusting the pH of the liquid used to flood the containment structure of a nuclear reactor following an accident. The liquid is recirculated in a cooling loop in order to cool the reactor core. More particularly, the present invention relates to a method and apparatus for adjusting the pH of the slightly acidic recirculating solution of borated water used to flood the containment structure of a nuclear reactor following an accident so that the borated water being recirculated becomes slightly basic.

In nuclear power plants, an emergency core cooling system is provided in order to remove the stored and fission product decay heat from the reactor core, and thus cool the reactor core, following an accident such as a pipe break resulting in the loss of the primary coolant or of the secondary coolant. Such an emergency core cooling system, for example in the case of a pressurized water reactor (PWR) plant, involves the flooding of the containment structure of the nuclear reactor, e.g. to a level of about 10 feet, with a slightly acidic solution of borated water which is then recirculated through the legs of the reactor coolant system. The emergency core cooling system, which includes pumps, residual heat removal heat exchangers, etc., recirculates the water by pumping it out of an emergency containment sump provided in the floor of the containment structure, which is conventionally formed substantially of concrete and which will leach chlorides into the water being recirculated. In order to protect stainless steel components of the nuclear reactor plant, i.e. in the reactor, the coolant piping, and the safeguard systems, against chloride stress corrosion and cracking, the pH of the water being recirculated must be adjusted to greater than or equal to pH=8.5 within 48 hours after the accident.

In the known nuclear reactor plants, the above mentioned pH adjustment is normally carried out by the addition of a caustic solution of sodium hydroxide to a spray system provided within the containment structure which sprays the caustic solution throughout the atmosphere of the containment structure. This known method of adjusting the pH has two significant disadvantages. Firstly, for some accident scenarios, i.e., depending on the type and severity of the accident, the spray system may not be activated. Secondly, it may not be desirable for the caustic solution of sodium hydroxide to be sprayed over the various components of the containment structure and other plant components for reasons of clean up and the caustic effects on paint, insulation, etc.

SUMMARY OF THE INVENTION

It is therefore the basic object of the present invention to provide a method and apparatus for adjusting the pH of the liquid, and in particular the borated water, used to flood the containment structure to cool the reactor core following an accident, which will avoid the problems and drawbacks discussed above.

The above object is basically achieved according to one aspect of the invention by a method for automatically and passively adjusting the pH of the recirculating liquid used to flood the containment structure of a nuclear reactor upon the occurrence of an accident in order to cool the reactor core, wherein the containment structure has a concrete floor which is provided with at least one sump from which the liquid is withdrawn for recirculation via at least one output pipe, and wherein the method comprises the steps of: prior to flooding and during or prior to normal operation of the reactor, providing at least one perforated basket within the sump, with the basket containing crystals of a pH adjusting chemical which is soluble in the liquid to be circulated; and covering each basket with a plastic coating which is likewise soluble in the liquid to be circulated, whereby upon flooding of the containment structure the liquid in the sump will reach the level of the baskets, causing the coating and the crystals to be dissolved and the chemical to mix with the recirculating liquid to adjust the pH.

As pointed out above, since the liquid used to flood the containment structure is normally slightly acidic, and in particular a slightly acidic solution of borated water, the chemical (amount and type) contained in the baskets is such as will raise the pH of the liquid, and in particular to a value of at least 8.5. According to the preferred embodiment of the invention, the water soluble pH adjusting chemical is sodium tetraborate and the water soluble protective coating for the basket is formed of polyethylene oxide.

The above object is basically achieved according to the apparatus of the present invention in that in a nuclear reactor containment structure which is to be flooded with a recirculating liquid for cooling the reactor core upon the occurrence of an accident, and which include a concrete floor having a sump therein, and at least one sump outlet pipe opening into said sump for for withdrawing liquid from the sump for cooling and recirculation; at least one perforated metal container is mounted on a side wall of the sump with the container containing crystals of a chemical which is soluble in the liquid used to flood the containment structure and which can raise the pH of the liquid, and a protective plastic coating of a material which is soluble in the liquid is provided for each container.

According to further features of the invention, the container is formed of stainless steel, preferably in the form of a wire mesh, and is mounted on the side wall of the sump adjacent the outlet pipe and so that its bottom surface is a desired distance above the bottom of the sump. According to the preferred embodiment of the invention, at least two of these containers containing crystals and covered with the protective coating are provided in the sump with the containers being laterally disposed on opposite sides of the outlet pipe. In general, the containers or baskets are placed close to the outlet pipe so as to enhance the flow of liquid or water through the baskets, and thus the mixing of the chemical with the recirculating water.

The method and apparatus for adjusting the pH according to the invention has several advantages over the above described known method. Initially, the pH adjustment according to the invention is direct (to the liquid or water in the sump) as opposed to indirect as in the spray additive arrangement. Moreover, the method and apparatus according to the invention results in a totally passive system, requiring no operator actions, or pumps or valves which require operation. Additionally, the pH adjustment is made according to the invention only when required, precluding any concerns of inadvertent chemical addition or the spraying of a caustic solution on certain components. Finally, the components, and in particular the baskets or containers, used according to the present invention are low maintenance components compared with the components required in the known method.

DETAILED DESCRIPTION OF THE PREFERRED EMBODIMENTS

Figure 1:
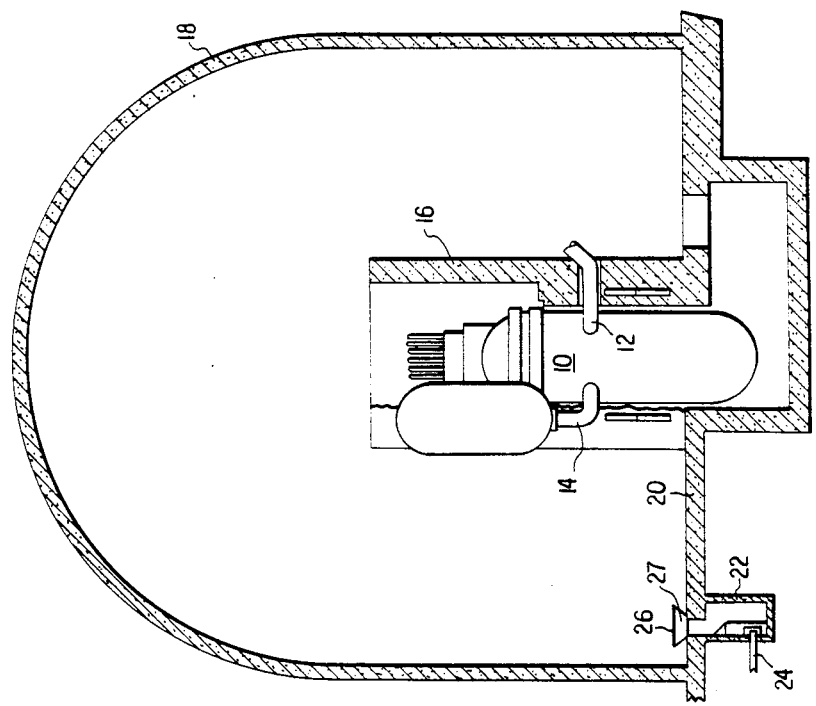
FIG. 1 is a schematic sectional view of a nuclear reactor containment structure showing the general location of the emergency containment sump.

Referring now to FIG. 1, there is shown a nuclear reactor 10 of the pressurized water type, which is provided with a coolant inlet line 12 and a coolant outlet line 14. As is known in the art, the reactor 10 contains a nuclear core (not shown) which generates substantial amounts of heat. The heat generated by the reactor core is conveyed from the core by coolant flow entering the reactor 10 through the inlet line 12 and exiting through the outlet line 14. The coolant exiting through the outlet line 14 is conveyed to a heat exchanger (not shown) where it is cooled and then recirculated by a pump (not shown) through the reactor via the inlet line 12. It is to be understood that although only one pair of inlet and outlet lines 12 and 14 respectively are shown, a typical reactor may include two, three or four primary coolant systems including respective inlet and outlet lines 12 and 14.

As further shown in FIG. 1, the reactor 10 is mounted within a separate reactor cavity surrounded by a concrete wall 16, with the reactor 10, the wall 16, as well as a substantial amount of equipment required for the nuclear reactor plant being disposed within a containment structure 18. As indicated above, and as is conventional for power generating plants containing such nuclear reactors, upon the occurrence of an accident involving the substantial loss of reactor coolant, either in the primary system or in the secondary system (not shown), to enable the reactor core to be cooled, the containment structure 18 is flooded with borated water from accumulaters (not shown) in the containment structure 18 and a water tank external to the containment (not shown). In order to be able to recirculate this flooding water for the containment structure so as to cool same, a plurality of sumps 22 (only one of which is indicated in the drawing) are provided in the floor 20 of the containment structure 18, with each sump 22 being provided with at least one outlet pipe 24, which leads to a heat exchange system (not shown) which cools the flooding water and then returns the cooled water to the containment structure. Depending on the nature of the accident, the recirculation of the water used to flood the containment structure may take place for a substantial period of time, for example, up to three years.

As indicated above, the liquid used to flood the containment structure is a slightly acidic solution of borated water which will leach the chlorides from the substantial number of concrete surfaces with which it comes into contact, and in order to protect the stainless steel components of the reactor and its connected parts against chloride stress corrosion and cracking, the pH of the flood water must be adjusted to a value equal to or greater than 8.5 within 48 hours after the accident. According to the present invention, the desired adjustment of the pH of the flood water is accomplished automatically and in a simple and passive manner by providing baskets containing crystals of an appropriate chemical within the sumps 22 so that upon flooding of the containment structure 18 the chemical will be dissolved and mixed with the flood water. The manner in which this is brought about is shown in FIGS. 2 to 4.

Figure 4:
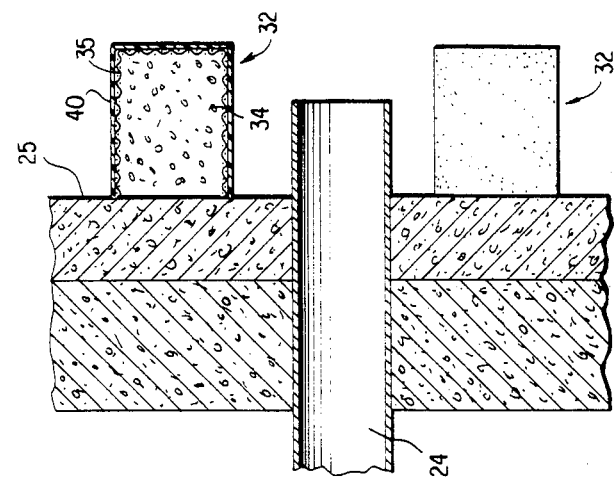
FIG. 4 is a detailed sectional view in the direction B—B of FIG. 3.
Figure 2:
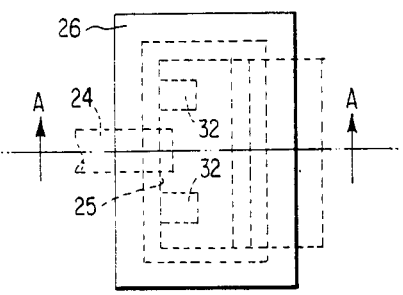
FIG. 2 is a top plan view of a containment emergency sump incorporating the present invention.
Figure 3:
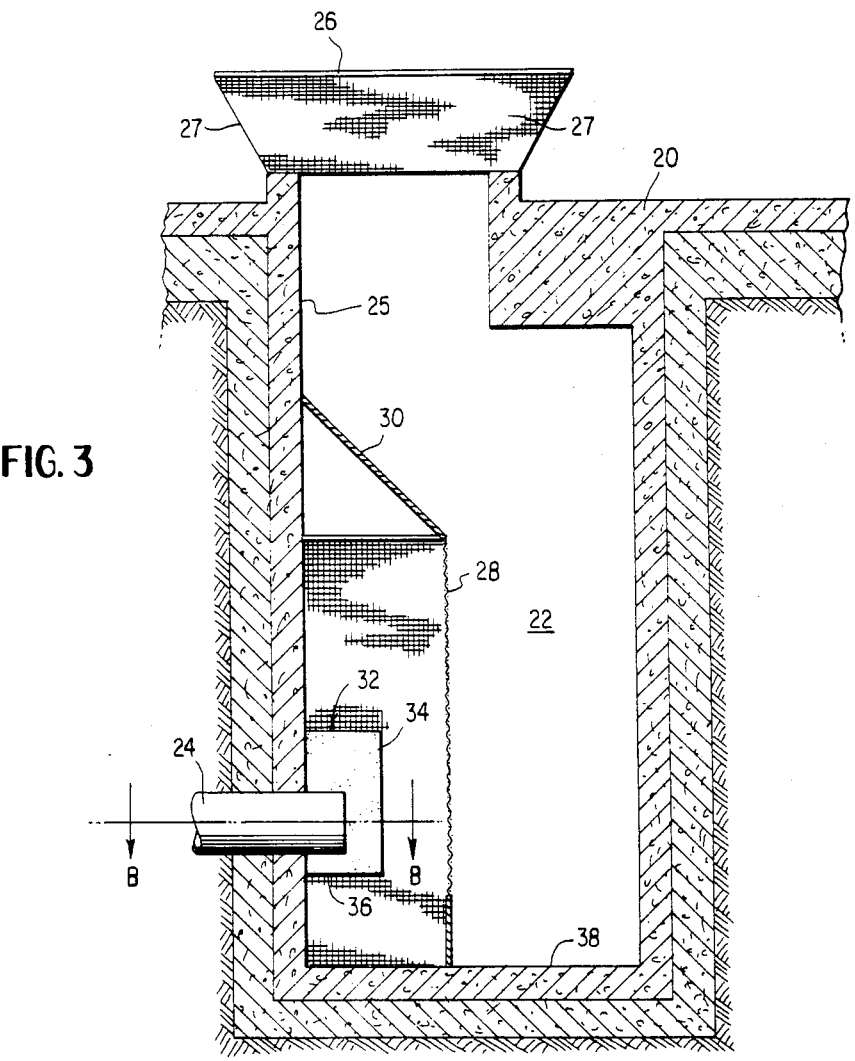
FIG. 3 is enlarged cross sectional view in the direction A—A of FIG. 2.

As shown in FIGS. 2 to 4, the sump 22 formed in the containment structure floor 20 has a single outlet pipe 24 which extends through the side wall 25 of the sump 22 near the bottom of same. Although only one outlet pipe 24 is shown, in many cases the sumps are provided with two such outlet pipes. In the illustrated construction of the sump 22, the upper open end is provided with a removable raised cover 26 with the supporting side surfaces 27 being provided with screens or gratings through which water can enter the sump 22. As shown, the inlet end of the outlet pipe 24 is preferably provided with a screened enclosure 28 to prevent any debris which may enter the sump with the flood water from entering the outlet pipe 24. Moreover, to minimize damage to the screened enclosure 28, as shown the roof of the enclosure 28, which is preferably also formed of stainless steel, is provided with a solid inclined panel 30. Disposed within the sump 22 is at least one perforated stainless steel basket 32 containing crystals 34 of a water soluble chemical which can raise the pH of the borated flood water to the desired pH. Such a chemical may, for example, be sodium tetraborate. Preferably, as shown in FIG. 4, the basket 32 is formed of a stainless steel screen or mesh material 35 to permit maximum flow of water through the basket 32 to dissolve the chemical crystals 34.

In order to enhance the mixing of the crystals 34 of the chemical with the recirculating flood water, the basket 32 should be located near the inlet of the outlet pipe 24. Accordingly, in the case of an output pipe 24 extending through the side wall 25 of the sump 22, the basket 32 preferably is mounted, as shown, on the side wall 25 adjacent but laterally disposed from the outlet pipe 24. As further shown in the drawings, perferably two baskets 32 containing crystal 34 are provided in the sump 22 with the baskets being laterally disposed on opposite sides of the pipe 24. Moreover, as shown in the figures, the baskets 32 are mounted on the side wall 25 so that the bottom 36 of the basket 32, which preferably also is perforated or formed of a wire screen or mesh, is located a desired or given distance above the floor 38 of the sump 22 in order to prevent extraneous water which may collect in the sump 22, i.e. water resulting from other than a flooding condition, from reaching of the baskets 32 and dissolving the crystals 34. Moreover, to prevent hygroscoption of water by the crystals 34 from the atmosphere in the sump 22, for example as a result of such extraneous water being present in the sump 22, the exterior of each basket 32 is covered with a protective coating 40 of a water soluble plastic material, for example polyethylene oxide, as best shown in FIG. 4.

With baskets 32 which are provided with the protective coating 40 and which are mounted as shown in FIGS. 2–4, the crystals 34 in the basket will be protected from normal operation splashes of water by the enclosure 28 and to some extent by the protective coating 40. However, in the event of a flooding condition following an accident, the water will collect in the sumps 22 and when the water level reaches the level of the baskets 32, the water will dissolve the coating 40 and then the crystals 34 of the pH adjusting chemical. The chemical will thus be introduced to the water in the sump for further mixing and pH adjustment of the flood water being recirculated via the outlet pipe 24. Of course, the baskets 32 must be sized so that they are able to contain a sufficient quantity of the crystals 34 of the pH adjusting chemical to provide the desired increase in the pH of the known quantity of borated flood water.

It will be understood that the above description of the present invention is susceptible to various modifications, changes and adaptations, and the same are intended to be comprehended within the meaning and range of equivalents of the appended claims.

I claim:

1. A method of automatically and passively adjusting the pH of the recirculating liquid used to flood the containment structure of a nuclear reactor upon the occurrence of an accident in order to cool the reactor core, wherein the containment structure has a concrete floor which is provided with at least one sump from which the liquid is withdrawn for recirculation via at least one outlet pipe; said method comprising: prior to flooding and during or prior to normal operation of the reactor, providing at least one perforated basket within at least one sump with the basket containing crystals of a pH adjusting chemical which is soluble in the liquid, and covering each basket with a plastic coating which is likewise soluble in said liquid, whereby upon flooding of the containment structure the liquid in the sump will reach the level of the baskets, causing said coating and said crystals to be dissolved and said chemical to mix with the recirculating liquid to adjust the pH.

2. A method as defined in claim 1 wherein: said liquid is slightly acidic; and said chemical is of a composition which will raise the pH of the recirculating liquid.

3. A method as defined in claim 2 wherein said liquid is a slightly acidic solution of borated water.

4. A method as defined in claim 3 wherein said chemical is sodium tetraborate.

5. A method as defined in claim 3 wherein said protective coating is formed of polyethylene oxide.

6. A method as defined in claim 3 wherein said chemical is present in sufficient quantity to raise the pH to at least 8.5.

7. In a nuclear reactor containment structure, which is to be flooded with a recirculating liquid for cooling the reactor core upon the occurrence of an accident, including a sump in the concrete floor of the containment structure and at least one sump outlet pipe opening into said sump for withdrawing liquid from said sump for cooling and recirculation; the improvement comprising: at least one perforated metal container mounted on a side wall of said sump and containing crystals of a chemical which is soluble in the liquid used to flood said containment and which can raise the pH of said liquid; and a protective plastic coating for each said container, with said plastic coating being formed of a material which is soluble in said liquid.

8. Apparatus as defined in claim 7 wherein said liquid is a slightly acidic solution of borated water and said chemical is of the type and is present in sufficient quantity to change said liquid to a basic solution.

9. Apparatus as defined in claim 8 wherein said chemical is sodium tetraborate.

10. Apparatus as defined in claim 8 wherein said plastic coating is formed of polyethylene oxide.

11. Apparatus as defined in claim 7 wherein said container is formed of stainless steel.

12. Apparatus as defined in claim 11 wherein said container is formed of a wire mesh.

13. Apparatus as defined in claim 11 wherein said container is mounted in said sump adjacent said outlet pipe.

14. Apparatus as defined in claim 13 wherein said container is mounted on said side wall so that its bottom surface is a desired distance above the bottom of said sump.

15. Apparatus as defined in claim 14 wherein said outlet pipe opens into said sump through said side wall.

16. Apparatus as defined in claim 15 wherein at least two of said containers containing said crystals and provided with said protective coating are provided in said sump with said containers being laterally disposed on opposite sides of said outlet pipe.

17. Apparatus as defined in claim 16 wherein each said container is mounted on said side wall of said sump so that its bottom surface is a desired distance above the bottom of said sump.

* * * * *